Aug. 15, 1950      A. E. LINCKE      2,519,192
DEVICE FOR THE FILING OF PLANS, DRAWINGS, MAPS, ETC
Filed Feb. 5, 1947
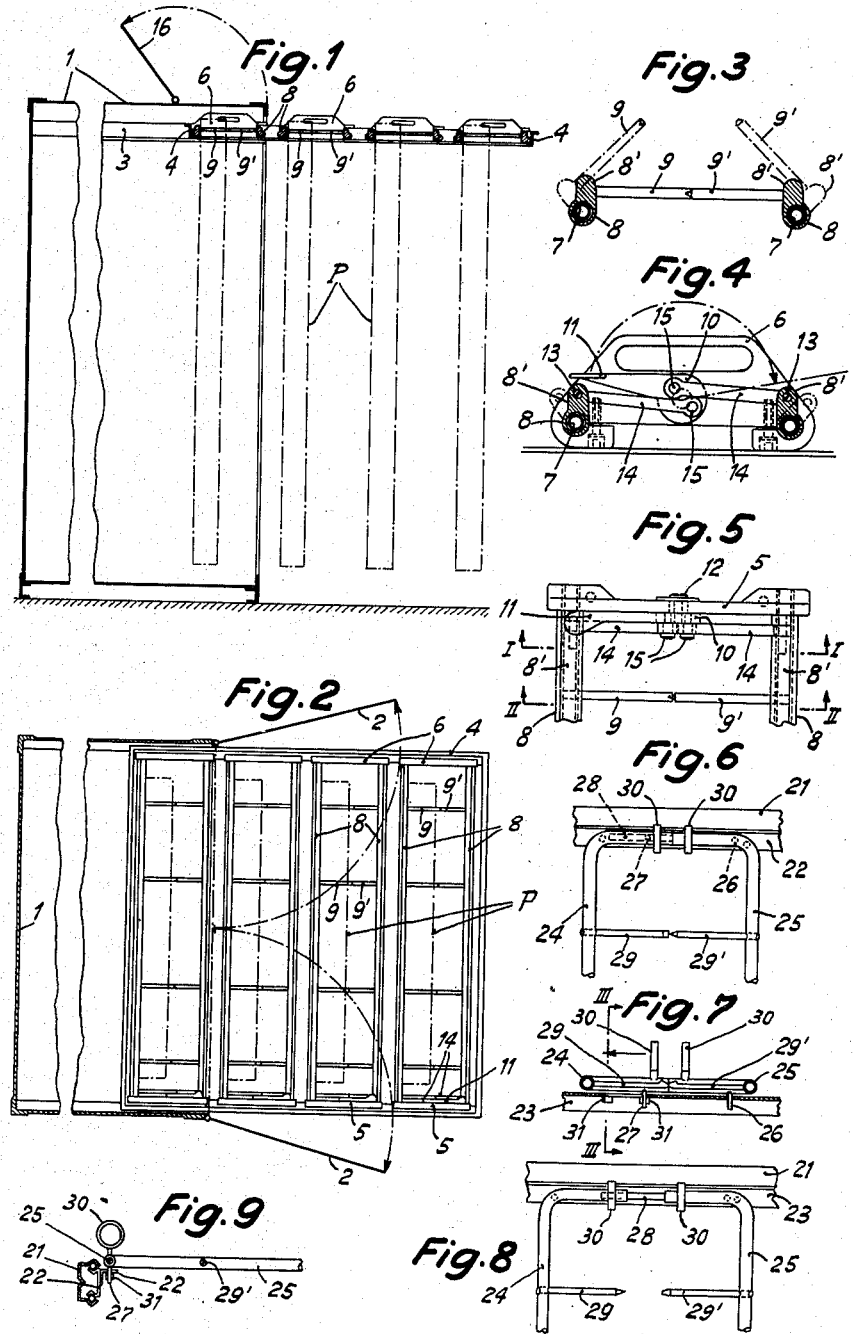

Patented Aug. 15, 1950

2,519,192

UNITED STATES PATENT OFFICE 2,519,192

DEVICE FOR THE FILING OF PLANS, DRAWINGS, MAPS, ETC.

Albert Ernst Lincke, Zurich, Switzerland

Application February 5, 1947, Serial No. 726,631
In Switzerland January 18, 1946

Section 1, Public Law 690, August 8, 1946
Patent expires January 18, 1966

7 Claims. (Cl. 45—2)

The devices hitherto known for the filing of plans, drawings, maps, etc., are laborious to operate and pay too little heed to the protection of the valuable record material they are designed to hold.

The object of the invention is a device for the filing of plans, drawings, maps, and the like, comprising several units for the accommodation of such material, each such unit possessing two parallel carrying members possessing suspension elements so arranged as to be directed towards each other and intended for the accommodation of the plans, drawings, etc., suitably perforated to fit them, at least one of these carrying members being adjustable to either of two different positions, in one of which the suspension elements directed towards each other mutually engage by their ends, in such manner as to permit of the plans, etc., being pushed from the suspension elements of the one carrying member on to the suspension elements of the other carrying member, whilst in the other position of the carrying member the suspension elements directed towards each other, are so widely separated at their ends that any desired plan, etc., can be removed from the device without difficulty.

The device can possess several filing units each consisting of two carrying members with suspension pins, disposed on a draw-frame which may be fixed or may be capable of being pulled out, in the manner of a drawer, from a timber or steel cabinet.

If there are not more than two units, these can be disposed on a carrying frame fixed, in the form of an open console, to a wall.

The drawing illustrates two typical embodiments of the invention, in which:

Fig. 1 is a vertical section through the device, in its extended position, built into a steel cabinet.

Fig. 2 is the device in plan, with a horizontal section through the steel cabinet, Fig. 3 is a cross section through two carrying members with suspension pins, along line II—II of Fig. 5.

Fig. 4 is a cross section through two carrying members with operating device, along line I—I of Fig. 5.

Fig. 5 is a partial plan of a carrying member.

Fig. 6 is a partial plan of a second embodiment of a carrying member, in its closed position.

Fig. 7 is a vertical elevation to Fig. 6.

Fig. 8 is a partial plan according to Fig. 6 with the carrying member in its open position, and Fig. 9 is a side elevation along the line III—III of Fig. 7.

The device depicted for the filing of plans, drawings, maps, etc. in accordance with the first embodiment, possesses a steel cabinet 1 provided with two doors 2 at its open front end. Two horizontal guide rails 3 are secured to the upper portion of the lateral walls of the inside of the cabinet. An angle-iron frame 4 is so disposed on these guide-rails as to be capable of being pulled out towards the front. On this frame suspension units, which can be removed and are provided with stops, for plans, drawings, maps, etc., are securely mounted. The suspension units each possess two lateral plates 5 and 6 taking the form of hand-grips, which lateral plates are rigidly bolted together by means of two parallel tubular supports 7. The tubular supports 7 carry bearer rods 8, of eccentric section and having cheeks 8' directed upwards, to which cheeks suspension pins 9, 9' directed towards each other, are secured. On the inner side of the lateral plate 6 a rotary disc 10 with a hand lever 11 is rotatably mounted on a pivot 12. Near to the lateral plate 6 control arms 14 are pivotally connected to the cheeks 8' of the bearer rods 8, by means of pivots 13, which control arms are, at their other ends, so pivotally connected by means of pivots 15 to the rotary disc 10 that when the lever 11 is swung over to the other side the bearer arms 8 are turned outwards and their suspension pins are moved into a position inclined to the horizontal, as shown in Fig. 3 by a line of dots and dashes. The suspension pins of one side are provided with convex ends and those of the other side with concave ends, so that in the horizontal position, with their ends mutually engaging, they form a continuous bridge. The plans, drawings, maps, etc., requiring to be filed are perforated along their top edge and titled above the perforations. The plans, drawings, maps, etc., are suspended from the pins 9 or 9' of one or other of the carrying members by means of these perforations. When the pins are lowered into their horizontal position, the plans, etc., can be pushed across from the pins of one carrying member on to the pins of the other carrying member, and back. Access to the filing units for the plans, etc., is easily secured, for the purpose of searching for the desired plan, by pulling out the carrier frame 4 when the cabinet doors have been opened. By opening the lid 16 on the top of the cabinet 1, easy access is also obtained to the plans filed on the rearmost unit which, when the carrier frame has been pulled out, is still inside the cabinet. The plans filed in the individual suspension units are indicated by the letter P.

In order to extract the desired plan, etc., the plans are separated into two groups in such a manner that those plans which are filed in front of the plan which it is desired to extract are suspended from the pins of one of the carrying members, whilst that plan which it is desired to extract, together with the plans filed behind it, are suspended from the pins of the other carrying member. When the plans are so separated the hand lever 11 is swung round, this causing suspension pins to move into the inclined position in accordance with the line of dots and dashes in Fig. 3, enabling the plan required to be extracted.

The embodiment of the device for filing plans, etc., represented by Figs. 6 to 9 possesses two fixed, parallel guide rails 21 on which a carrier frame 22 runs on ball bearings and is capable of being pulled out. To the inner side of the lateral members of the carrier frame 22 are fixed angle-irons 23, on the horizontal webs of which hanger arms 24 and 25, which together form a filing unit, are disposed. Hanger arm 25 is fixed by two pins 26 which engage in drill-holes in the angle-irons 23, whilst hanger arm 24 has two pins 27 which engage in longitudinal slots in the angle-irons, in such manner that hanger arm 24 is displaceable in the lengthwise direction of the angle-irons. The two hanger arms 24 and 25 are of tubular form. Guide rods 28 are inserted into the shanks of hanger arm 25, on which guide rods the shanks of hanger arm 24 are guided. 29 and 29' are the suspension pins on which the plans, etc., are filed. 30 are hand grips secured to the hanger arm shanks, and 31 are spring clamps which alternate in acting upon the pin 27 and lock the hanger arm in its closed or open position.

Fig. 6 shows the two hanger arms 24 and 25 of a filing unit in the closed position, in which the plans suspended from the suspension pins can be pushed across from the suspension pins 29 on to the suspension pins 29' and back. In order to extract a desired plan the hanger arm 24 can, after the plans have been suitably distributed between the two carrying members, be pushed, by means of the grips 30, into the position shown in Fig. 8, and the plan required can be extracted from the device.

When the quantity of material of the described nature requiring to be filed is less considerable, filing appliances with a maximum of two filing units are sufficient. In this case the carrier frame supporting the filing units takes the form of a mural console, the plans being suspended openly in the device.

While the form of embodiment of the invention as herein disclosed, constitutes a preferred form, it is to be understood that some changes may be made in the arrangement, construction and combination of the various parts of my invention, and it is my intention to cover by my claims such changes as may reasonably be included within the scope thereof.

I claim as my invention:

1. In a device for the filing of plans, drawings, maps etc., in combination, a cabinet, a plurality of self-contained filing units each provided with handles and a pair of adjustable parallel carrying members having mutually opposed suspension pins and counter-pins whose ends are adapted to engage each other in their closed positions, for the accommodation and suspension of the plans, drawings, maps etc. which latter have been perforated for this purpose, and guide means for drawing out said filing units from said cabinet, whereby said filing units can be moved along, or separately removed from said guide means and said carrying members can be adjusted in said filing units for opening and closing said suspension pins without substantially altering the overall dimensions of the respective filing unit.

2. In a device for the filing of plans, drawings, maps etc., in combination, a cabinet, a plurality of self-contained filing units each provided with a pair of parallel side plates, handles on said side plates, and a pair of parallel carrying rods connecting said side plates and having pairs of mutually opposed studs engaging each other in their closed positions for the accommodation and suspension of the perforated plans, drawings, maps etc., guide rails in said cabinet for drawing out said filing units, and means for pivotally mounting said carrying rods in said side plates, in such a way that by oppositely turning said carrying rods, said studs can be opened and closed.

3. In a device of the character described, in combination, a cabinet, a plurality of self-contained filing units each provided with a pair of parallel side plates, handles on said side plates and a pair of parallel carrying rods connecting said side plates and having pairs of mutually opposed studs engaging each other in their closed positions for the accommodation and suspension of perforated plans, drawings, maps etc., guide rails in said cabinet for drawing out said filing units, and means for effecting a slight transverse relative displacement of said carrying rods in said side plates, in such a way that said studs can be closed and opened by opposite transverse displacement of said carrying rods.

4. In a device of the character described, in combination, a cabinet, a plurality of self-contained filing units each provided with a pair of parallel carrying rods connecting said side plates and having pairs of mutually opposed studs mounted eccentrically on said carrying rods, for accommodating and suspending perforated plans, drawings, maps etc., guide rails in said cabinet for drawing out said filing units, and means for pivotally mounting said carrying rods with respect to said side plates, in such a way that by oppositely turning said carrying rods, said studs can be opened and closed.

5. In a device of the character described, in combination, a cabinet, a plurality of self-contained filing units each provided with a pair of parallel side plates, handles on said side plates, a pair of parallel tubular supports connecting said side plates, and tubular carrying rods rotatably mounted on said supports and having pairs of mutually opposed studs whose inner ends engage each other in their closed positions, for accommodation and suspension of perforated plans, drawings, maps etc., guide rails in said cabinet for drawing out said filing units, and means for pivotally mounting said carrying rods in said side plates, in such a way that by oppositely turning said carrying rods said studs can be opened and closed.

6. In a device of the character described, in combination, a cabinet, a plurality of self-contained filing units each provided with a pair of parallel side plates, handles on said side plates, and a pair of parallel carrying rods which are pivotally mounted on said side plates, pairs of mutually opposed studs mounted on said carrying rods with their ends engaging each other in their closed positions for the accommodation and suspension of perforated plans, drawings, maps etc., a hand lever swingably mounted on one of said side plates, a rod and lever system for connecting said hand lever with said carrying rods, in such a way that by operating said hand lever the carrying rods can be turned in opposite directions, for opening said pairs of studs, and guide rails in said cabinet for drawing out said filing units.

7. In a device of the character described, in combination, a cabinet, a plurality of self-contained filing units each provided with a pair of parallel side plates, handles on said side plates, and a pair of parallel carrying rods which are pivotally mounted in said side plates, pairs of mutually opposed studs mounted on said carrying rods with their ends engaging each other in their closed positions for the accommodation and suspension of perforated plans, drawings, maps etc., operating levers on said carrying rods, a hand lever swingably mounted on one of said side plates, a rod gear for connecting said hand lever with said operating levers in such a way that by operating said hand lever the carrying rods can be turned in opposite directions, for opening said pairs of studs, and guide rails in said cabinet for drawing out said filing units.

ALBERT ERNST LINCKE.

REFERENCES CITED

The following references are of record in the file of this patent:

UNITED STATES PATENTS

| Number | Name | Date |
|---|---|---|
| 909,440 | Minder | Jan. 12, 1909 |
| 1,134,616 | Johanson | Apr. 6, 1915 |
| 1,335,415 | Adams | Mar. 30, 1920 |
| 1,416,661 | Barnhart | Mar. 16, 1922 |
| 2,205,903 | Mobus | June 25, 1940 |